United States Patent [19]

Cronin

[11] 4,286,113
[45] Aug. 25, 1981

[54] TELEPHONE SYSTEM EAVESDROPPING DEVICE

[76] Inventor: Eugene J. Cronin, 5 Cedar Ct., Menlo Park, Calif. 94025

[21] Appl. No.: 334,440

[22] Filed: Feb. 2, 1953

[51] Int. Cl.³ .............................................. H04K 1/00
[52] U.S. Cl. ............................ 179/1 MN; 179/81 E; 179/1.5 R
[58] Field of Search .......................... 179/1, 1.5, 2, 2.5, 179/1.5 R, 1 MN, 81 E; 250/6.6

[56] References Cited

U.S. PATENT DOCUMENTS 2,206,590  7/1940  Webb ................................ 179/1.5 R
2,461,646  2/1949  Lewis .

Primary Examiner—H. A. Birmiel

Attorney, Agent, or Firm—Brady, O'Boyle & Gates

EXEMPLARY CLAIM

1. In a telephone system including a telephone microphone at a subscriber's position, a telephone receiver and circuit connections there-between, contact terminals for said circuit connections and a disconnect switch associated with said contact terminals, subscriber circuit connections leading to the aforesaid connection, means located remote from said subscriber's position for impressing high-frequency energy on said subscriber circuit connections, signal translating means connected with said means effecting capacitative connection through said contacts and disconnect switch with said microphone whereby said microphone operates to modulate said means while said disconnect switch is disconnected from said contacts.

15 Claims, 1 Drawing Figure

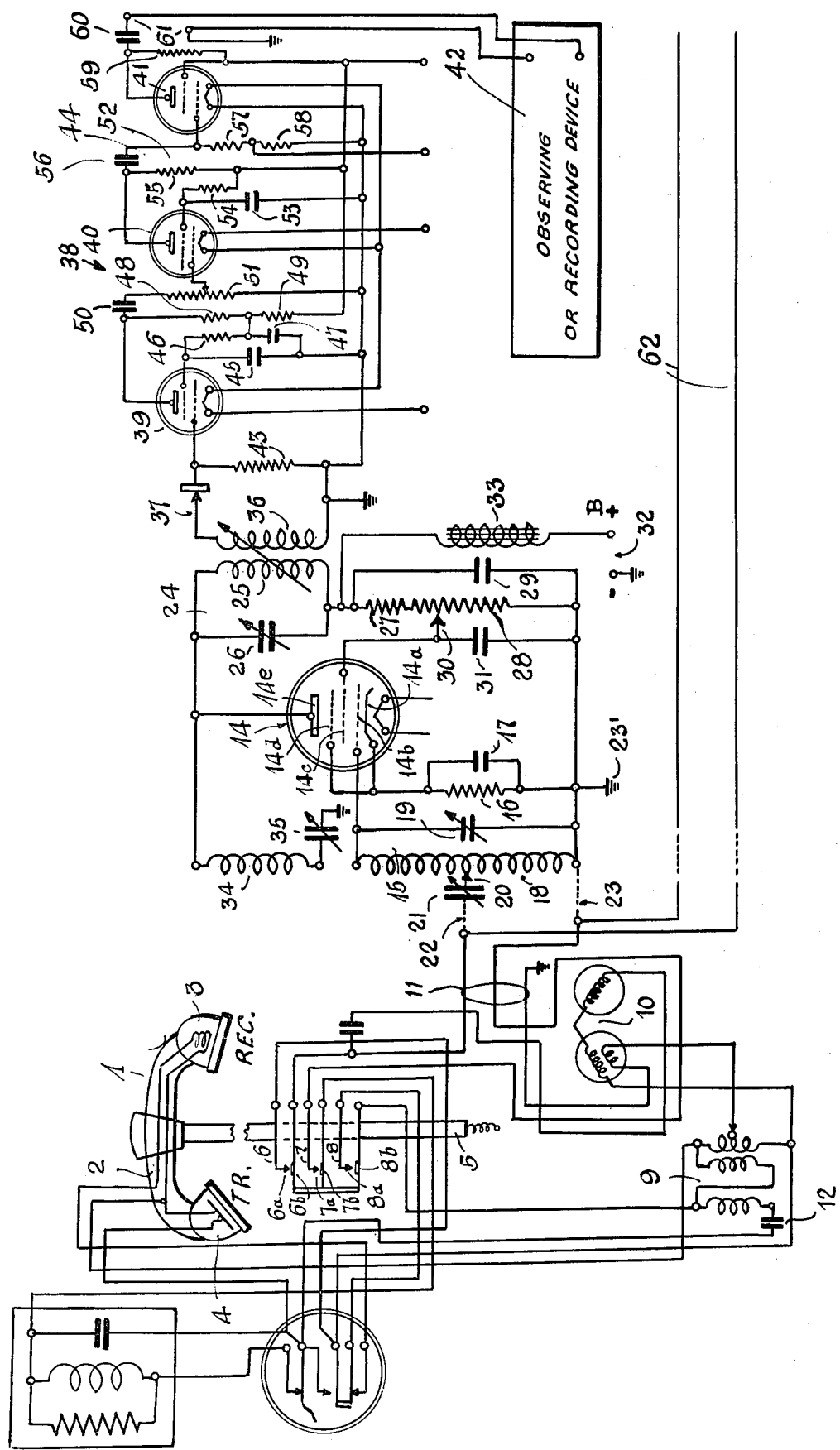

TELEPHONE SYSTEM EAVESDROPPING DEVICE

My invention relates broadly to telephone systems and more particularly to a method and apparatus for employing the conventional telephone system as a composite microphone pickup device and intercept for telephone calls placed to or made from a telephone subscribers circuit.

One of the objects of my invention is to provide a method for converting a conventional telephone subscribers circuit into a telephone pickup and intercept system without impairing the conventional operation of the telephone instruments.

Another object of my invention is to provide a method of superimposing on a conventional telephone subscribers circuit high frequency energy beyond the range of the voice frequency circuits normally employed in the telephone system with signal detection or recording means associated therewith utilizing the conventional telephone microphone as a microphone pickup independently of whether the handset is removed from the cradle or not and also utilizing the telephone subscribers circuit as an intercept for calls being placed to or from the telephone instruments.

Another object of my invention is to provide an arrangement of telephone pickup and intercept apparatus which may be connected with a telephone subscribers line at any place between the telephone exchange and the telephone subscribers instrument and operating to utilize the conventional telephone microphone as a sound pickup device while the handset, including the microphone, remains in position on the conventional cradle and also providing intercept means for telephone calls placed to or from the telephone instruments.

Another object of my invention is to provide a circuit arrangement for establishing a coupling with a telephone subscribers circuit from a source of high frequency energy and associated signal detection or recording means for effecting a modulation of the high frequency energy by the conventional telephone microphone while the subscribers circuit is otherwise inactive and/or utilizing the telephone microphone for simultaneously modulating the telephone subscribers circuit at voice frequencies for conventional two-way telephone communications while such communications are being intercepted by the apparatus of my invention.

Still another object of my invention is to provide a circuit arrangement for a high frequency energy and associated signal detection or recording means wherein the said generator operates in a frequency range of from 150 kilocycles to 5 megacycles and is capable of being modulated by the conventional telephone microphone independently whether the handset, of which the microphone forms a part, is resting upon the conventional telephone cradle or not for effecting modulation of the signaling detecting or recording circuit without impairing the use of the telephone as a conventional communications device.

Other and further objects of my invention reside in a method and apparatus for the composite tapping and utilization of a telephone subscribers circuit as a microphone pickup device for recording conversations which may occur in the sound activating area of the telephone microphone whether the handset, of which the microphone forms a part, is in use or not as set forth more fully in the specification hereinafter following by reference to the accompanying drawing which diagrammatically shows the circuit arrangement of my invention applied to a conventional telephone subscribers circuit for employing the microphone of the subscribers telephone set as a pickup and providing an intercept for telephone conversations over the telephone subscribers circuit.

My invention is directed to a method and apparatus for the tapping of telephone lines and for the utilization of such lines as a microphone pickup from the telephone transmitter of the telephone set in the telephone subscribers circuit, independently of whether the handset is removed from or is resting upon the cradle. The method and apparatus of my invention may be performed without approaching the telephone instrument and by connections made in a position remote from the telephone instrument at any distance between the telephone exchange and the telephone instrument, wherever it may be convenient.

The method and apparatus of my invention may be applied to any conventional telephone whereby the telephone transmitter becomes a microphone pickup so that when the telephone is not in use conversations within the sound range of the telephone transmitter may be detected and recorded independently of whether the telephone instrument is in use or not. In addition to this the method and apparatus of my invention serve as an intercept for detecting or recording any telephone calls placed to or from the telephone subscribers circuit to which the apparatus of my invention is connected. I accomplish these results by impressing upon the telephone subscribers circuit from a remote location high frequency electrical energy in the frequency range of 150 kilocycles to 5 megacycles which is wholly remote from the frequency range over which the conventional telephone operates and is beyond the voice frequency range. At the frequency at which the apparatus of my invention operates the conventional telephone receiver of the telephone handset does not respond. That is to say the radio frequency component generated by the attachment of my invention is not detectable in the subscribers telephone receiver because of the high impedance of the telephone receiver over the frequency range of 150 kilocycles to 5 megacycles. However, the transmitter of the conventional handset of the subscribers telephone circuit serves as a variable resistor at the frequencies of the radio frequency currents impressed upon the subscribers circuit. The pressures from sound waves in the vicinity of the telephone transmitter tend to alter the resistance of the transmitter and thereby modulate the impressed radio frequency energy so that the sound waves are converted into electrical impulses which return through the circuit of my invention and are rectified, amplified and reproduced in a sound reproducer or recorded on a recorder connected to the output of the amplifier of the apparatus of my invention. At the frequencies at which the apparatus of my invention operates, the conventional cut-off switch, the contacts associated therewith and the circuit contacts with which the said contacts coact constitute capacitances which, at the frequencies over which the system of my invention operates, negate the operational effectiveness of the cut-off switch and permit the radio frequency currents to enter the telephone transmitter, and to be controlled thereby where the transmitter operates as a variable resistor thus modulating the high frequency oscillator system in the apparatus of my invention and correspondingly controlling the detection and recording apparatus.

The circuit elements in a conventional telephone subscribers set all coact under conditions in which high frequency currents are impressed upon the service pairs leading to the telephone subscribers set to provide paths for the high frequency current from the subscribers circuit all the way to the telephone transmitter of the telephone handset without regard to the open connections which may be encountered at the cut-off switch. That is to say the open contacts themselves in the telephone set constitute capacity areas which coact with each other to form capacitances through which the high frequency currents impressed upon the telephone subscribers circuit reach the telephone transmitter. The telephone transmitter in picking up the sound waves operates as a variable resistor for modulating the remote source of high frequency energy which in turn operates a detector or demodulating circuit. This same condition applies whether the telephone handset is resting upon the cradle or is removed therefrom, for as the handset is removed and the cut-off switch closes, the subscribers circuit operates directly into the high frequency equipment of my invention modulating the equipment and functioning the detector and the recording apparatus.

Referring to the circuit diagram in more detail, reference character 1 schematically indicates a cradle type telephone subscriber's set arranged to receive the hand set indicated at 2 which includes the telephone receiver 3 and the telephone transmitter 4. The cradle 1 is vertically displaceable against the action of spring means schematically illustrated at 5 which raises the cradle 1 when the weight of the handset is removed. The cradle 1 operates a multiplicity of leaf springs which I have indicated at 6, 7 and 8. The leaf springs carry contacts 6a, 7a and 8a, respectively. These contacts coact with aligned contacts represented at 6b, 7b and 8b. The last mentioned contacts form contact terminals for the circuits which interconnect the telephone subscribers circuit including the induction coil 9 and the associated ringing device 10. The telephone circuit is shown associated with the conventional dial, transformer system and filter. This is a conventional arrangement wherein the microtelephone or telephone transmitter 4 is disposed in close proximity to the inductive portions of the network with substantial capacity coupling between the circuit components of the telephone set. The telephone microphone 4 in itself can be reduced to an equivalent circuit constituted by a network including resistance capacity and inductance which is closely coupled to the circuit components of the telephone set both electrically and magnetically. This close proximity of the circuit components with the telephone microphone 4 insures transfer of high frequency currents capacitatively in carrying out the principles of my invention. The compact association of the electrical circuit components with the microphone circuit sets up sufficient inductance in the set to cause the radio frequency carrier to effectively jump the switch contacts 6a–6b; 7a–7b; and 8a–8b and permit the radio frequency current to energize the microphone 4, so that it is responsive to room noise and thereby in turn modulates the same radio frequency current. Since the radio frequency current flows in a closed circuit and every component is effectively in series, anything that alters one set of conditions will be transmitted throughout the entire hookup and finally reach the detector in the remote receiver and from there to the amplifier which will handle only the demodulated signal, i.e., the pickup from the room in which microphone 4 is located. The telephone subscribers circuit leading to the telephone line is indicated generally at 11, the circuit to the telephone subscribers set including the capacitor 12. The circuit arrangement is intended to illustrate a conventional telephone subscribers set, the purpose of illustrating the circuit being to emphasize the fact that for the superimposed high frequencies employed in the system of my invention in the frequency range of 150 kilocycles to 5 megacycles, the telephone transmitter 4 operates as a variable resistor for modulating such high frequencies while the telephone receiver 3 possesses such high impedance that the high-frequency currents employed are not detectable in the telephone receiver 3. The purpose of illustrating the conventional telephone subscribers circuit is also to bring out the fact that the separation of contacts 6a and 6b and contacts 7a and 7b is very slight in the open-circuit position whereby the contacts serve as capacity areas providing a path for the high-frequency currents which flow to the telephone microphone 4 and are modulated by the change in resistance therein.

The high-frequency current of 150 kilocycles to 5 megacycles are generated in the tube circuit represented at 14. For purpose of more clearly understanding my invention, it may be observed that tube 14 is a pentode including cathode 14a, control grid 14b and additional grids 14c and 14d and anode 14e. The control grid 14b connects to one end of a tunable circuit 15, the other end of which connects to the cathode 14a through the resistor 16, shunted by condenser 17. The tunable circuit 15 includes inductance 18 and tuning condenser 19. An adjustable tap 20 is provided on inductance 18 and this tap connects through the adjustable condenser 21 to the circuit terminals 22 and 23 which connect to the telephone subscribers circuit 11 at any location thereon between the telephone exchange and the telephone instrument. The tap 20 is adjustable along inductance 18 so that the telephone line impedance is matched to the input impedance of tube 14 between control grid 14b and cathode 14a. One side of input circuit connects to ground as shown at 23'. Additional grid 14d connects to the cathode end of the input circuit as shown.

The output circuit of tube 14 connects between anode 14e and cathode 14a and includes the tunable circuit 24 constituted by inductance 25 and adjustable condenser 26 and the network constituted by resistors 27 and 28 and condenser 29. An adjustable tap 30 is provided on resistor 28 and connected with grid 14c. Condenser 31 connects between the cathode circuit and the adjustable tap 30. The power source for the output circuit connects to the terminals 32. The positive side of source 32 connects through radio-frequency choke 33 with the anode circuit of tube 14. A feed-back loop is connected with the plate 14e and includes the inductance 34 and the adjustable condenser 35 connected to ground. The inductance 34 is loosely coupled to inductance 18 in the input circuit of tube 14 and sustains the high-frequency oscillations through the telephone subscriber's circuit.

The output circuit of the oscillation system terminating in inductance 25 is coupled to the inductance 36 which connects to the input of the rectifier circuit represented at 37. The rectifier circuit may be of the tube detector type or of the germanium type. The output of the rectifier system connects to the input of the signal responsive circuit which includes the multi-stage amplifier 38.

The amplifier 38 includes three stages indicated by tubes 39, 40 and 41 and are conductively coupled one to the other and connected to the output system represented at 42. The input circuit to the amplifier 38 includes high-resistance 43 coupling the output of the rectifier system with the input of the amplifier and with the input circuit of tube 39. The output circuit of tube 39 is coupled with the input circuit of tube 40 through the resistance capacitor network represented at 44. The network 44 comprises condenser 45, resistor 46, condenser 47, resistor 48, resistor 49, condenser 50 and volume control 51. The output circuit of tube 40 connects with the input circuit of tube 41 through resistance-capacitor network 52. The resistance-capacitor network 52 comprises condenser 53, resistor 54, resistor 55, condenser 56, resistor 57 and resistor 58. The output circuit of tube 41 includes resistor 59 and condenser 60 connected with the telephone circuit or to a voice recorder at terminals 61. In carrying out my invention, I have successfully utilized the following circuit components and electron tubes in the circuits illustrated:

| Reference Character | Component | Value |
| --- | --- | --- |
| 14 | Pentode | 6AQ5 |
| 16 | Resistor | 300 Ohms |
| 17 | Condenser | 3000 μμf |
| 18 | Inductance | |
| 19 | Condenser | 500 μμf |
| 21 | Condenser | 10,000 μμf |
| 25 | Inductance | |
| 26 | Condenser | 50 μμf |
| 27 | Resistor | 100 K Ohms |
| 28 | Resistor | 50 K Ohms |
| 29 | Condenser | |
| 33 | Radio-Frequency Choke | |
| 34 | Inductance | |
| 35 | Condenser | 100 μμf |
| 36 | Inductance | |
| 39 | Tube | CK512A |
| 40 | Tube | CK512A |
| 41 | Tube | CK525A |
| 43 | Resistor | 5 Meghoms |
| 45 | Condenser | .005 μf |
| 46 | Resistor | 2.2 Meghoms |
| 47 | Condenser | .04 μf |
| 48 | Resistor | 1 Meghom |
| 49 | Resistor | 700 K Ohms |
| 50 | Condenser | .001 μf |
| 51 | Volume Control | 22.5 K Ohms |
| 53 | Condenser | .005 μf |
| 54 | Resistor | 2.2 Meghoms |
| 55 | Resistor | 1 Meghom |
| 56 | Condenser | .001 μf |
| 57 | Resistor | 4.7 Meghoms |
| 58 | Resistor | 1500 Ohms |
| 59 | Resistor | 100 K Ohms |
| 60 | Condenser | .002 μf |

While I have set forth the various values of the components of the circuit arrangement contained in the apparatus of my invention, it is to be understood that these values are merely for the purpose of explaining one embodiment of my invention and are to be considered in the illustrative sense and not in the limiting sense.

It will be understood that the audio-frequency telephone modulations are conducted over the telephone subscriber's line, indicated generally at 62, simultaneously with the intercept operation which is carried out with the method and apparatus of my invention connected at terminals 11 of the telephone subscriber's circuit through terminals 22 and 23 of the apparatus of my invention. That is to say, the telephone transmitter 4 is used as a modulator of the high-frequency currents when the telephone hand set 2 is resting on the cradle 1 in the position illustrated and the circuit connections through contacts 6a-6b and 7a-7b are open for picking up the pressures from sound waves in the responsive area of the transmitter 4 for altering the resistance of the transmitter 4 and converting the sound waves into electrical impulses which are modulated, rectified, amplified and utilized to control the output circuit 61. It will be understood that a capacitative coupling is established between the telephone subscriber's set and the high-frequency generator system for controlling the recording system while the telephone subscriber's set, to all outward appearances, is not in use. While the telephone hand set is reposing in the normal condition intended for its use as a telephone, it will be understood that the many loops of wire within the telephone subcriber's set, not only within the hand piece and feeder line from the service pair but also the cross hook-ups from the circuit itself which are juxtaposed not only to the disconnect switch but also to the telephone transmitter, establish that degree of capacitance which at the frequency of operation of the system of my invention, that is, in the range of 150 kilocycles to 5 megacycles, negate the operational effectiveness of the disconnect switch and provide a capacitative path for the high-frequency currents to the telephone microphone 4. The carbon granules of the telephone microphone 4, under the effects of variable pressure, from sound waves picked up in the responsive area of the transmitter, constitute a variable resistor which converts the sound waves into electrical impulses for controlling the modulator, rectifier and recording system used in the method and apparatus of my invention.

The inductance 18 and its associated variable condenser 19 are so tuned that they balance out the line impedance so that the energy arriving at the subscribers set is not appreciably reduced in transit. The result is that resonance is established in that leg of the circuit and maintained throughout the balance of the unit through the adjustment of the associated variable condensers and inductances. By operation of the resonance circuits, there is very little power lost from the oscillator so that only a small amount of power is required in carrying out the pickup for intercept operation. Amplifiers may be inserted where required.

The germanium rectifier 37 is advantageous as a space-saving device, but any type of rectifier may be used to accomplish the demodulation.

As soon as the hand set 2 is removed from the cradle 1 and the disconnect switch closes its contacts 6a-6b and 7a-7b, placing the telephone components in connection with the telephone subscriber's circuit 62 and disconnecting the ringing circuit by opening contacts 8a and 8b, the entire telephone circuit becomes active, changing the balance of the monitoring unit of my invention. Under these conditions, the monitoring unit operates as a tap and amplifier as the ratio between the straight DC telephone circuit and the high-frequency circuit is destroyed. The high-frequency component remains on the line but is relatively so weak and is so far beyond the frequency of the telephone receiver 3 that it is not detectable by the subscriber since it does not effect the telephone receiver because of its impedance. However, the monitoring system readily intercepts telephone communications into or out of the telephone subscriber's set.

While I have set forth my invention in certain of its preferred embodiments, I realize that modifications in detail may be made, and I desire that it be understood that no limitations upon my invention are intended except as may be imposed by the scope of the appended claims.

What I claim:

1. In a telephone system including a telephone microphone at a subscriber's position, a telephone receiver and circuit connections there-between, contact terminals for said circuit connections and a disconnect switch associated with said contact terminals, subscriber circuit connections leading to the aforesaid connection, means located remote from said subscriber's position for impressing high-frequency energy on said subscriber circuit connections, signal translating means connected with said, means effecting capacitative connection through said contacts and disconnect switch with said microphone whereby said microphone operates to modulate said means while said disconnect switch is disconnected from said contacts.

2. In a telephone system, a telephone subscriber circuit including a microphone at a subscriber's position for effecting audio-frequency modulations, a telephone receiver, circuit connections there-between terminating in contact terminals, a disconnect switch associated with said contact terminals and with said telephone subscriber circuit, said disconnect switch being movable into and out of connection with said contact terminals for connecting or disconnecting said telephone receiver and microphone with said telephone subscriber circuit, a source of high-frequency currents located remote from said telephone subscriber's position and connected with said telephone subscriber circuit and a signal responsive circuit connected with said source, said source of high-frequency current being operative to impress high-frequency current upon said microphone at said subscriber's position by capacitative transfer of high-frequency energy through said disconnect switch and said connect terminals associated therewith whereby said microphone in addition to the audio-frequency modulations impressed upon said subscriber circuit operates to modulate said source for controlling said signal responsive circuit independently of the position of said disconnect switch.

3. A telephone system, as set forth in claim 2, in which said source of high-frequency currents operates over a frequency range remote from the audio-frequency range over which said telephone subscriber circuit operates.

4. A telephone system, as set forth in claim 2, in which said source of high-frequency currents operates over a range of from 150 kilocycles to 5 megacycles.

5. A telephone system, as set forth in claim 2, in which the impedance of said source of high-frequency currents is adjustable to match the impedance of said telephone subscriber circuit.

6. A telephone system, as set forth in claim 2, in which said source of high-frequency currents is loosely coupled with said telephone subscriber circuit and includes a loop circuit for feeding back energy between said telephone subscriber circuit and said source of high-frequency currents.

7. A telephone system, as set forth in claim 2, in which a rectifier is interposed between said source of high-frequency currents and said signal responsive circuit.

8. A telephone system, as set forth in claim 2, in which said source of high-frequency currents comprises an electron tube including a cathode, a multiplicity of grid electrodes and an anode and in which a tuned circuit is included between said cathode and one of said grids and coupled with said telephone subscriber circuit and wherein a separate tuned circuit is connected between said anode and said cathode and coupled with said signal responsive circuit, and a separate tuned path connected between said anode and said cathode and coupled with said first-mentioned tuned circuit.

9. A telephone system, as set forth in claim 2, in which said source of high-frequency currents comprises an electron tube including a cathode, a multiplicity of grid electrodes and an anode and in which a tuned circuit is included between said cathode and one of said grids and coupled with said telephone subscriber circuit and wherein a separate tuned circuit is connected between said anode and said cathode and coupled with said signal responsive circuit, and a separate tuned path connected between said anode and said cathode and coupled with said first-mentioned tuned circuit, said tuned circuits and said tuned path all being adjustable over a frequency range of 150 kilocycles to 5 megacycles.

10. The method of remotely intercepting signaling energy from a telephone subscriber set of the type including a telephone receiver, a telephone microphone, electrical circuit connections there-between terminating in switch contacts, a disconnect switch having contacts aligned with the aforesaid contacts and movable into and out of circuit connection therewith, which consists in superimposing high-frequency energy upon the telephone subscriber circuit from a position remote from the position of the telephone subscriber set in a frequency range beyond the voice-frequency range of the telephone microphone, modulating the said high-frequency energy from the telephone microphone through capacitative coupling effected through the contacts and reproducing the modulated high-frequency energy independently of and corresponding to voice modulation transmitted over the telephone subscriber circuit.

11. The method of remotely intercepting telephonic signals from a telephone microphone in a telephone subscriber set of the type including a telephone receiver, a telephone microphone, circuit connections there-between terminating in contacts, a disconnect switch having contacts coacting with the aforesaid contacts and movable from circuit open position to circuit closed position comprising superimposing upon the telephone subscriber circuit high-frequency energy at a frequency so related to the operating characteristics of the telephone receiver that the said frequency has no effect upon the telephone receiver and at a frequency at which the telephone microphone operates as a variable resistor whereby the superimposed high-frequency currents are modulated by the telephone microphone and transmitted over said telephone subscriber circuits independently of the position of the coacting contacts, rectifying the modulated high-frequency currents and observing the signaling modulations independently of and corresponding to the transmission of telephonic currents from the telephone microphone over the telephone subscriber circuit.

12. The method of picking up sound modulations through the telephone microphone of a telephone subscriber set which includes a telephone microphone, a telephone receiver, circuit connections there-between terminating in contacts, a disconnect switch having contacts coacting with the aforesaid contacts and movable to open or closed position for disconnecting the telephone set from or connecting the telephone set with the telephone subscriber circuit which consists in impressing upon the telephone subscriber circuit high-frequency energy at a frequency which is capacitatively transferable through the aligned contacts of the disconnect switch while open to the telephone microphone for modulation thereby and transmittal through the telephone subscriber circuit, rectifying the modulated high-frequency energy and observing the rectified modulated high-frequency energy independently of and corresponding to modulated telephone currents transmitted by said telephone microphone over said telephone subscriber circuit.

13. The method of remotely picking up sound vibrations on a telephone subscribers circuit of the type including a telephone microphone and receiver and a cutoff switch including contacts movable from a closed position to a capacitatively aligned open position which consists in impressing high frequency currents on the telephone subscribers circuit from a remote location for effecting an electrically conductive path through the contacts in said circuit in either the capacitatively aligned open position of the contacts or the closed position thereof, and reproducing at the remote location modulations incident to sound vibrations picked up by the telephone microphone.

14. The method of remotely picking up sound vibrations within the area of the microphone of a telephone subscribers set of the type including a telephone microphone, a telephone receiver and a switching device having contacts movable between a circuit closing position to a capacitatively related circuit opening position which comprises generating high frequency currents at a remote location, impressing the generated high frequency currents on the telephone subscribers circuit for effecting an electrically conductive path across the contacts independently of the conductive or capacitative position thereof and monitoring at the remote location the modulations produced by the telephone microphone independently of telephone conversations conducted over the telephone subscribers set.

15. The method of remotely monitoring sound vibrations within the area of the microphone of a telephone subscribers set of the type including a circuit opening and closing system having contacts movable from a circuit closing position to a capacitatively aligned circuit opening position which comprises generating at a location remote from the position of the telephone subscribers set electrical currents at a frequency beyond the audibility of the telephone subscribers set and effective to establish an electrically conductive path for the generated high frequency electrical currents through the contacts independently of the closed or open position thereof through the microphone of the telephone subscribers set and reproducing at a remote location the modulations of the generated high frequency currents effected by the microphone of the telephone subscribers set simultaneously with and corresponding to sound vibrations incident upon the microphone of the telephone subscribers set.

* * * * *